B. M. W. HANSON.
ANTIFRICTION BEARING.
APPLICATION FILED NOV. 27, 1918.
1,307,493.
Patented June 24, 1919.
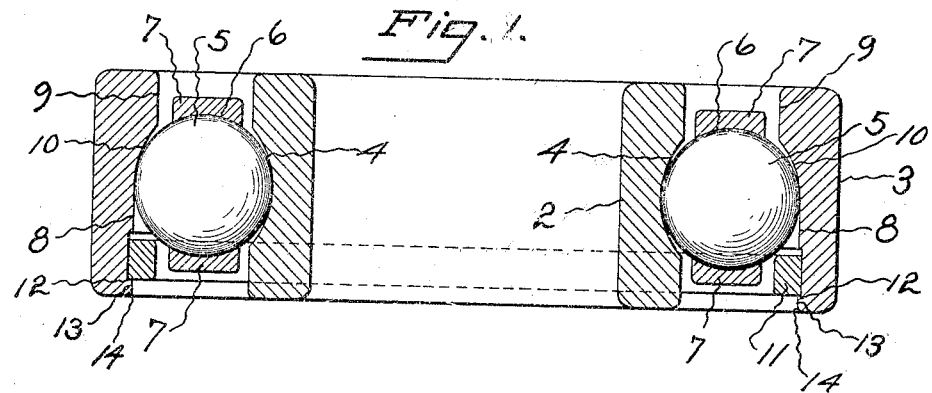
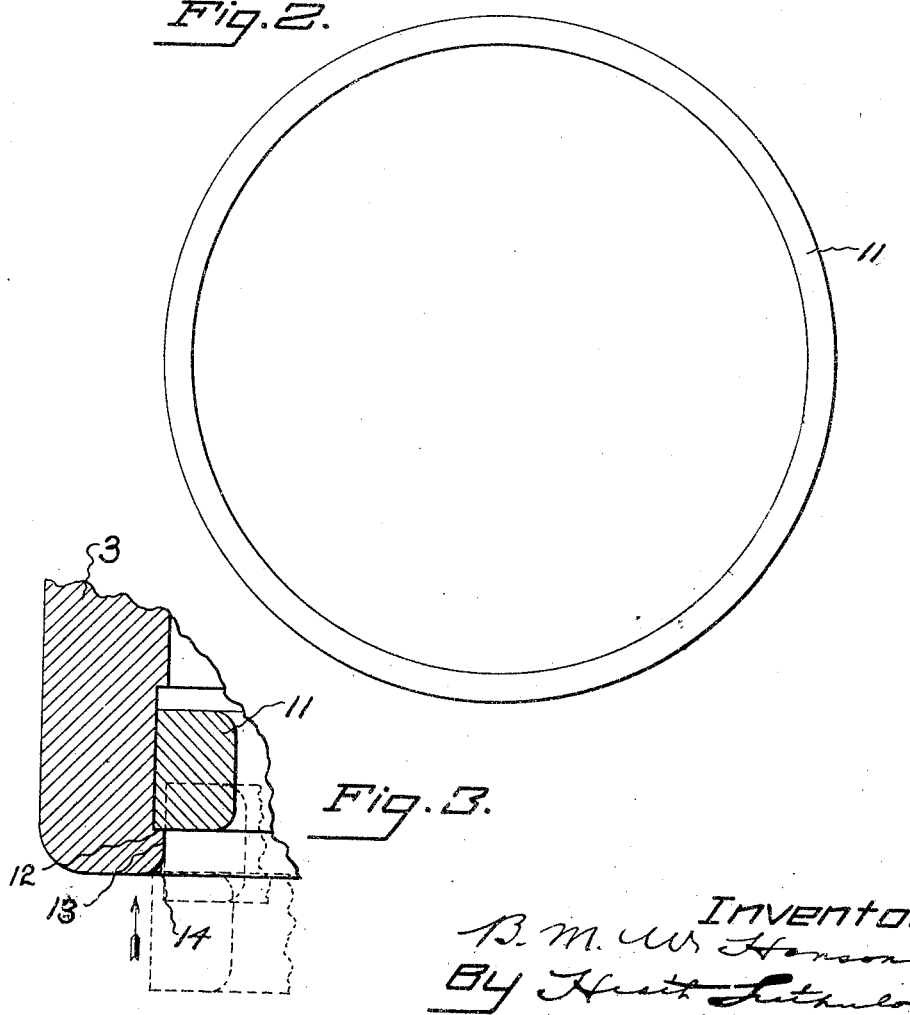

UNITED STATES PATENT OFFICE.

BENGT M. W. HANSON, OF HARTFORD, CONNECTICUT.

ANTIFRICTION-BEARING.

1,307,493.   Specification of Letters Patent.   Patented June 24, 1919.

Application filed November 27, 1918. Serial No. 264,332.

*To all whom it may concern:*

Be it known that I, BENGT M. W. HANSON, a citizen of the United States, residing at Hartford, in the county of Hartford and State of Connecticut, have invented certain new and useful Improvements in Antifriction-Bearings, of which the following is a specification.

This invention relates to anti-friction bearings among the objects of the invention being to provide an article of this character the parts of which may be readily, quickly and easily assembled, and which is of such construction as to insure proper action.
The device can be used in a great many different connections.

In the drawings accompanying and forming part of the present specification, I have represented a form of embodiment of the invention which to enable those skilled in the art to practice the same will be set forth fully in the following description. Obviously I am not restricted to this disclosure. I may depart therefrom in several respects within the scope of the invention defined by the claims following said description.

Referring to said drawings,

Figure 1 is a cross section of a bearing involving the invention.

Fig. 2 is an elevation of a stop-ring.

Fig. 3 is a sectional detail on an enlarged scale showing by dotted lines the way of mounting the stop-ring.

Like characters refer to like parts in the several views of the drawings.

The bearing comprises in its makeup suitable race members which may within limits, vary the inner race member 2 and the outer race member 3 answering my requirements.
One is generally rotary or revoluble at least, with respect to the other which is ordinarily but not essentially fixed. In the present case the inner race member is rotary being fixed for example upon a shaft or spindle. The outer race member is fixed therefore in the bearing for said shaft of whatever character the same may be. The front lateral surfaces of the two race members 2 and 3 are practically in the same plane although the rear side surface of the race member 2 is slightly back of the corresponding surface of the member 3. These points, however, are not ordinarily of vital importance.

In the race member 2 is an annular or circumferential channel or groove 4 transversely curved to receive anti-friction rollers which as shown are in the form of balls or spheres 5. These rollers or balls 5 are set as shown in openings as 6 in the spacer 7, customarily made in the form of a ring or band. There may be any desirable number of these balls. The openings 6 which receive the balls, have their walls spherical, the narrow sides of said openings being next the race member 2. The balls are in the present case, extended through the spherical openings 6 from the outer sides of said openings and as will be clear cannot be projected through the latter externally, but they are free to run in the race, channel or groove 5. As a matter of fact this spacer or ring 7 with its set of balls is not uncommon in certain forms of anti-friction bearings.

The inner side of the race member 3 has two portions 8 and 9 of different diameters connected by a surface 10 which is upon a transverse curve or arc uniting the portion of less diameter 8 with the portion of greater diameter or radius 9. The connecting surface 10 receives the balls 5. In view of the construction to which I have referred, it will be clear that the balls 5 can revolve in their openings in the ring 7 and that this ring with its group of balls can then be fitted around the race member 2 so that the balls will find a seat in the annular channel or race 4. The race member 3 can then be slipped over the spacer or ring 7 and the group of balls therein, and also the race member 2, so as to cause the balls 5 to bear against the curved connecting surface 10.

I also provide means of an effective nature for preventing the parts from separating or for positively maintaining their assembled relation so as to present in effect a unit. The means for accomplishing this result may vary although desirably including a stop member, and the ring 11 which may be of soft steel answers my requirements in this respect. This ring like the other parts may vary somewhat. Preferably, however, it is circular and of one piece, an advantage as a matter of fact following this particular condition. The outer race member 3 as shown has an abutment as 12 for said stop ring. The abutment may obviously within limits vary, but desirably it is presented by the inner face of an annular bead 13 in the inner front side as shown, of the race member 3. This annular bead 13 as a matter of fact in the present instance, is integral with the race member 3 and it terminates at the front thereof. I should note at this point that the external diameter of the ring 11 is greater than the maximum inner diameter of the annular bead 13, the latter obviously being situated upon the greater diametrical portion 9 of the race member 3. It will also be observed that the inner surface 14 of this annular bead is as upon a taper the taper being outwardly. This is to say the inner surface 14 of this bead diverges outwardly.

It will be assumed that the parts with the exception of the stop ring 11, are in assembled relation or on the condition previously set forth and that it is desired to mount the stop ring 11 in position. In this case the following procedure may be adopted: The stop ring 11 is introduced into the opening of the race member 3 from the larger end thereof and is then forced into place, its peripheral portion traversing the surface 13 during this action. The consequence of this is that the ring is somewhat contracted, the amount being comparatively small. The drive is continued until the ring 11 leaves the bead and when it does do so it can spring or expand back of the bead and its outer side engage the shoulder or stop surface 12. The ring 11 although held in place in a substantial and secure manner, is in no sense permanently fitted in place because under proper conditions it can be removed but force will be requisite to accomplish this result. When it is in operative position it presents an effective barrier to prevent the spacer or cage 7 and its balls being accidentally displaced.

When the bearing is in action there is no strain upon the stop ring 11 or practically none. As a matter of fact at this particular time it is not necessary that it should receive any thrusts, it being primarily intended merely to hold the spacer and its balls in position when the bearing is a unit. In some respects the invention involves certain broad relations; I might note while the spacer 7 is an efficient device its use is not absolutely essential in all cases.

I might call attention to the fact that the stop ring 11 is not only of one piece but that it is uninterrupted or non-split, the same statement applying in the present case, to the bead 13 and its stop surface 12. Obviously this is the character of stop ring which I prefer to employ but there may be instances where I can use one of a different form.

What I claim is:

1. An anti-friction bearing comprising inner and outer race members, a series of rollers between the race members, the outer race member having an annular bead provided with a shoulder and an uninterrupted annular one-piece member driven in place past said bead and abutting against the shoulder thereof.

2. An anti-friction bearing comprising inner and outer race members, a series of rollers between the race members, the outer race member having an annular bead provided with a shoulder, and an uninterrupted one-piece ring driven in place past said bead and abutting against the shoulder thereof, the external diameter of the ring being greater than the minimum internal diameter of the bead.

3. An anti-friction bearing comprising inner and outer race members, the outer race member having interiorly at its front an outwardly tapered integral bead and provided with a shoulder, a series of rollers between the race members, and an uninterrupted one-piece ring driven into place along said bead and abutting against the shoulder on the inner side thereof, the external diameter of the ring being greater than the minimum internal diameter of the bead.

4. An anti-friction bearing comprising inner and outer race members, the outer race member having an internal integral bead and provided with a shoulder, a series of rollers between the race members, and an uninterrupted one-piece ring driven into place along said bead and abutting against the shoulder on the inner side thereof, the external diameter of the ring being greater than the minimum internal diameter of the bead.

In testimony whereof I affix my signature in the presence of two witnesses.

BENGT M. W. HANSON.

Witnesses:
HEATH SUTHERLAND,
FREDERICK C. ALLEN.